United States Patent [19]

Koehler et al.

[11] Patent Number: 5,395,039
[45] Date of Patent: Mar. 7, 1995

[54] METHOD OF MAKING A FILTER ASSEMBLY

[75] Inventors: Paul C. Koehler; Michael B. Whitlock, both of Cortland, N.Y.; Vijay Y. Rajadhyaksha, Seminole; Ezekiel E. Westfall, Clearwater, both of Fla.

[73] Assignee: Pall Corporation, East Hills, N.Y.

[21] Appl. No.: 127,556

[22] Filed: Sep. 28, 1993

[51] Int. Cl.$^6$ .................................................. B23K 1/00
[52] U.S. Cl. .................. 228/248.5; 228/215; 210/232; 210/496
[58] Field of Search ................... 228/248.5, 248.1, 215; 210/493.2, 232, 496

[56] References Cited

U.S. PATENT DOCUMENTS

| | | | |
|---|---|---|---|
| 3,556,304 | 1/1971 | Collard et al. | 210/496 |
| 4,613,369 | 9/1986 | Koehler | 428/547 |
| 4,740,252 | 4/1988 | Hasegawa et al. | 228/248.1 |
| 4,822,692 | 4/1989 | Koehler | 428/547 |
| 4,828,930 | 5/1989 | Koehler | 428/547 |
| 4,932,582 | 6/1990 | Une | 228/248.1 |
| 4,983,423 | 1/1991 | Goldsmith | 210/496 |
| 5,149,360 | 9/1992 | Koehler et al. | 75/228 |

FOREIGN PATENT DOCUMENTS

| | | | |
|---|---|---|---|
| 63-259063 | 10/1988 | Japan | 228/248.1 |
| 90/13393 | 11/1990 | WIPO | 228/248.1 |

OTHER PUBLICATIONS

"Refractory Metal Powder Filled Braze," (33242) *Research Disclosure*, Dec. 1991, No. 332.

Primary Examiner—Kenneth J. Ramsey
Assistant Examiner—Jeffrey T. Knapp
Attorney, Agent, or Firm—Leydig, Voit & Mayer

[57] ABSTRACT

A method of making a filter assembly is described wherein a filter pack is seated in an end cap and contacted with a mixture comprising a binder and a particulate material including a low temperature component and a high temperature component. The filter pack, the end cap, and the particulate material are heat treated to form a strong, effective bond.

9 Claims, 1 Drawing Sheet

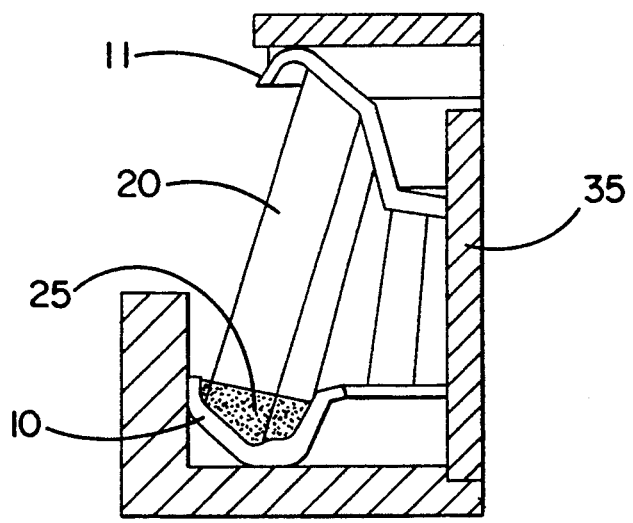
FIG. I

METHOD OF MAKING A FILTER ASSEMBLY

FIELD OF THE INVENTION

This invention relates to a filter assembly and a method of making a filter assembly, and, in particular, a method for bonding an end cap to a filter pack.

BACKGROUND OF THE INVENTION

An important aspect of the manufacture of filter assemblies is the process of bonding an end cap to a filter pack. As used herein, the term "filter pack" refers to any structure that includes a filter medium. The filter medium may be, but is not limited to, a metal mesh or a porous metal medium formed from metal powder or metal fibers.

One conventional method of bonding is known as brazing. The end of a filter pack is placed in an end cap with a brazing alloy and the resultant assembly heated until the brazing alloy melts. The assembly is then cooled and as the molten brazing alloy solidifies, it bonds the end cap to the filter pack.

One disadvantage of this brazing method is that the molten brazing alloy may wick up into or along the filter pack for a significant distance away from the end cap. This sometimes starves the joint between the filter pack and the end cap for brazing alloy, resulting in incomplete bonding. In addition, when the molten brazing alloy solidifies, it then blinds the porous filter medium, i.e., closes off the pores of the filter medium to fluid flow. This significantly decreases the effective filtration area of the filter medium and reduces the efficiency of the filter assembly.

In another conventional method of bonding, the end of a filter pack is compressed to form a dense area. A stainless steel ring and the compressed end of the filter are then positioned in an end cap. The entire assembly is then welded together.

This method gives rise to several disadvantages. By compressing the ends of the filter pack, the effective filtration area is reduced, thereby reducing the efficiency of the filter assembly. Compressing the ends of the filter pack may also damage the filter medium, creating leaks which are difficult to repair. This is a problem especially associated with pleated filter assemblies having wide, open pleats. Special tooling is required, which renders this method undesirably expensive. Further, welding the filter pack to the end cap frequently results in discoloration of the filter assembly.

SUMMARY OF THE INVENTION

Accordingly, the present invention provides a method of making a filter assembly comprising the steps of seating a filter pack in an end cap and contacting the filter pack and the end cap with a mixture including a binder and a particulate material, thus forming a filter assemblage. The particulate material includes at least two components. One of the particulate components, i.e., the low temperature component, melts at a lower temperature than the other particulate component, i.e., the high temperature component. The method of making the filter assembly further comprises the step of heat treating the filter assemblage at a temperature sufficient to drive or burn off the binder and to melt the low temperature component without melting the high temperature component of the particulate material, thus bonding the end cap to the filter pack.

Thus, in accordance with one aspect of the invention, the particulate material has a high temperature component, such as stainless steel powder, that does not melt when the particulate material is heated and has a low temperature component, such as nickel based alloy powder, that does melt when the particulate material is heated. The size of the particulate material is preferably chosen such that it provides a finer porosity than the porosity of the filter pack. When the low temperature component melts, it flows into the interstices or pores between the particles of the high temperature component and little or none of the molten low temperature component wicks along the filter pack away from the end cap. Consequently, little of the filter pack is blinded by the molten low temperature component. A method of making a filter assembly according to this invention is effective particularly when used in conjunction with filter packs including pleated or non-pleated filter media comprising fiber or powder metal, metal mesh, cylindrical wraps and the like and when used in conjunction with metal or ceramic end caps.

The present invention also provides a filter assembly comprising an end cap, a filter pack, and a bond fixing the end cap to the filter pack. The bond includes a first solidified metal component and a second particulate component contained by the first solidified metal component.

In accordance with this aspect of the invention, the bond formed between the end cap and the filter pack is exceptionally strong. During fabrication, the second particulate component impedes any wicking of the molten low temperature component along the filter pack away from the end cap, retaining the molten low temperature component adjacent to the end cap and the filter pack and preventing the joint between them from being starved of the molten low temperature component. Consequently, when the molten low temperature component solidifies, an exceptionally strong bond is formed between the end cap and the filter pack without the necessity of welding and its attendant disadvantages.

BRIEF DESCRIPTION OF THE DRAWINGS

FIG. 1 is a cross-sectional view of a filter assembly embodying the invention and including a filter pack disposed between end caps.

DETAILED DESCRIPTION OF THE EMBODIMENTS

The subject invention is directed to a method of making a filter assembly by fixing an end cap to a filter pack. Generally, in accordance with the method aspects of the invention, the filter pack is seated in the end cap, where seating generally refers to firmly locating the filter pack next to the end cap, such as by placing the filter pack in direct or indirect contact with a surface of the end cap. The filter pack and the end cap are brought into contact with a mixture comprising a binder and a particulate material to form a filter assemblage, where filter assemblage generally refers to the filter assembly at an intermediate state of formation. Subsequently, the filter pack and the end cap are fixed to one another by heat treating the filter assemblage, thus forming a filter assembly and creating a strong and effective bond between the filter pack and the end cap.

The end cap can be formed from any material that can withstand the temperatures encountered when the filter assemblage is heat treated. For example, the end cap is preferably formed from a material that can withstand temperatures of up to or within the range from about 1750° F. to about 2100° F. or greater. More preferably, the end cap comprises a metal or a metal alloy, including but not limited to: nickel, iron, titanium, chromium, molybdenum and tungsten. However, other suitable materials such as ceramics can also be used. Most preferably, the end cap is composed of stainless steel. Further, the end cap can be variously configured. For example, it may be a blind end cap or an open end cap, it may be flat, it may define a channel which receives the filter pack, and/or it may be irregularly shaped.

The filter pack includes a filter medium and may also include one or more support and/or grainage layers. A preferred filter medium is a porous metal medium formed, for example, from metal powder or metal fiber. Metal mesh media are also effective. While metal is a preferred material for the filter pack, the filter pack may alternatively be formed from any suitable material that can withstand temperatures of up to or within the range from about 1750° F. to about 2100° F. or greater. In addition, the filter pack can be formed from any of the materials suitable for the end cap. The pore ratting of the filter pack may vary over a wide range, e.g., from about 0.5 $\mu$m or less to about 1,000 $\mu$m or more. Further, the filter medium can be variously configured. For example, it may be pleated or non-pleated and it may be cylindrically, conically or disk shaped.

The particulate material may have various shapes including dendritic, acicular, fibril, and spherical. The particulate material may comprise a powder or a fiber. Preferably, the particulate material comprises a powder.

The particulate material preferably includes a low temperature component and a high temperature component. Preferably, the low temperature component may include materials that will melt at temperatures at or below 2100° F. Suitable materials include soldering alloys and, more preferably, brazing alloys such as nickel-copper brazing alloys, gas atomized nickel based alloys, silver based alloys, lead-tin based soft solder alloys, silver-copper based brazing alloys, or any other material that has a lower melting point than the high temperature component. A nickel-based brazing alloy available from Wall Colmonoy Corporation under the trade designation Nicrobraz ® is particularly preferred. Alternatively, the high temperature component may comprise a ceramic particulate including, but not limited to, silicon carbide, tungsten carbide, or silicon nitride.

The high temperature component preferably comprises materials that melt at temperatures above the low temperature component. For example, the high temperature component may comprise a metal or a metal alloy, including but not limited to: nickel, iron, titanium, chromium, molybdenum and tungsten or any alloy of these metals. Austenitic stainless steel, chromium nickel and copper nickel alloys are particularly preferred. 316L and 304L water atomized stainless steel are especially preferred. Alternatively, the high temperature component may comprise a ceramic particulate including, but not limited to, silicon carbide, tungsten carbide, or silicon nitride.

The particle sizes for the low and high temperature components of the metal particulate are chosen based on such factors as the porosity of the filter pack, the pore size of the filter pack, the wicking characteristics of the low temperature component and the affinity between the low temperature component, the high temperature component and the filter medium. Preferably the low temperature component has a nominal particle size of between about 1.0 $\mu$m and about 500 $\mu$m, where the nominal particle size may be determined for example with reference to the size of an opening in a standard mesh or by microscopic optical analysis. More preferably the nominal particle size is between about 1.0 $\mu$m and about 150 $\mu$m. A nominal particle size of about 45 $\mu$m is particularly preferred. Preferably, the high temperature component has a nominal particle size of between about 1 $\mu$m and about 500 $\mu$m. More preferably, the nominal particle size is between about 1 $\mu$m and about 150 $\mu$m. Most preferably the particle size is about 30 $\mu$m.

A preferred binder for the mixture is a polyacrylic acid such as that available from B. F. Goodrich Chemicals Company under the trade name Carbopol. Carbopol 934 and Carbopol 941 are particularly preferred. Carbopol 941 has a molecular weight of 1,250,000 and Carbopol 934 has a molecular weight of 3,000,000. Methycellulose, sodium alginate, and other carbopol family polymers are also suitable binders. In addition, braze cements such as Nicrobraz ® cement grade 500 available from the Wall Colmonoy Corporation, are suitable binders.

In a first embodiment of a method according to the invention, a filter pack 20 is seated in opposing end caps 10, 11, as shown in FIG. 1. The filter pack 20 may have a generally conical configuration and may comprise a pleated composite designed for inside-out flow. The filter medium may be a 304L stainless steel 325×325 wire mesh, each wire having a diameter of 0.0014" and being formed from 304L stainless steel. A drainage layer may be positioned on the downstream side of the filter medium and may be a 42×42 wire mesh having 0.006" and 0.0045" diameters, respectively. The lower end cap 10 generally defines a trough. One end of the filter pack 20 is positioned in the trough of the lower end cap 10 and a jig 35 holds the assemblage in place.

To form the mixture 25, the low temperature component of the particulate material is preferably first mixed with the high temperature component. The weight ratio of the low and high temperature components may be selected depending on such factors as: 1) the type materials used for the high and low temperature components; 2) the particle sizes; 3) the desired bond strength; 4) cost of materials, and 5) the propensity of the low temperature component to wick into the filter medium. Preferably, the weight ratio is in the range from about 10% to about 90%. Most preferably, the weight ratio is about 1:1. For example, about 45 $\mu$m particles of Nicrobraz ® nickel brazing alloy may be mixed with about 30 $\mu$m particles of 304L water atomized stainless steel in a weight ratio of about 1:1.

The binder is then mixed with a carrier liquid to form a binder mixture. Typically, a sufficient amount of binder is mixed with the carrier liquid such that the binder comprises about 0.1% to about 5% by weight of the binder mixture, based on the weight of the water. Preferably, Carbopol 934 may be mixed with water in a typical weight ratio of 1:70, based on the weight of the water, or any other suitable ratio.

The mixture 25 is then formed by mixing the binder mixture and the particulate mixture together. The volume ratio may be selected depending on such factors as: 1) the wetting ability of the low temperature component; 2) the viscosity of the mixture, and 3) the separation tendencies of the particulate (the mixture may be colloidal or noncolloidal). Preferably, the volume ratio is in the range from about 5:1 to about 1:3. Most preferably, the volume ratio is about 1:1. The mixture 25 of the particulate material and the binder is preferably stored in a closed container.

Next, the mixture 25, including the binder and the particulate material, is contacted with the end cap 10 and the filter pack 20. For example, the mixture 25 may be added to the trough of the end cap 10 by pouring the mixture into the trough around the inside and the outside of the filter pack 20.

While preparing the mixture 25 or adding the mixture 25 to the end cap 10, bubbles sometimes form in the mixture 25. It is preferable to eliminate bubbles because they may cause defects in the filter assembly after it is heat treated. Preferably, bubbles are removed by vacuum degassing. Vacuum degassing may be performed by inserting the filter assemblage in a vacuum chamber and applying a partial or total vacuum to the mixture 25 to remove any trapped gas. Alternatively, any other suitable method for removing gasses trapped in the mixture 25 can be used.

To work the mixture 25 into the filter pack 20 such that the ends of the pleats are covered with the mixture 25 and the mixture 25 insinuates or penetrates into the filter pack 20, the filter assemblage is preferably agitated. Agitation can be realized using any suitable mechanism for subjecting the filter assemblage to agitation. Preferably, the filter assemblage is placed onto a fixture and vibrated for between about 0.1 and about 2 minutes.

Most preferably, degassing and agitation take place before the mixture 25 dries to avoid unwanted defects in the bond. Since the "shelf life" of the mixture 25 is about 24 hours, vacuum degassing and agitation are preferably performed shortly after the mixture 25 is placed in contact with the end cap 10 and the filter pack 20. Most preferably, vacuum degassing and agitation are performed within about ten minutes of adding the mixture 25 to end cap 10 and the filter pack 20.

After agitation has been completed, at least a part of the carrier liquid is removed from the mixture 25, preferably by drying. However, the carrier liquid could be removed by means of a vacuum or any other suitable removal process. The drying time and temperature are determined according to the composition of the mixture 25. For a mixture including 304L stainless steel, Nicrobraz ® Carbopol 934, and water, it is preferred that drying take place for about 1.5 hours at about 180° F.

To attach the other end of the filter pack 20 to the opposite end cap 11, the jig 35 may be inverted and the above steps may be repeated. However, the filter assemblage is preferably dried the second time at about 180° F. for about 3 hours. By drying the filter assemblage for about 3 hours, any residual liquid left from the first drying step will be removed. After it is dried, the filter assemblage has considerable green strength due to the binder, which binds the end cap, the filter pack, and the particulate material together. This allows the filter assemblage to be removed from the jig 35 and routinely manipulated without damaging the filter assemblage.

To permanently bond the filter pack 20 to the end caps 10, 11, the filter assemblage is heat treated. Heat treatment is realized by placing the filter assemblage in a furnace preferably at a temperature sufficiently high to drive or burn off the binder and to melt the low temperature component of the particulate material without melting the high temperature component. For a filter assemblage including Nicrobraz ® nickel brazing alloy, stainless steel, and Carbopol the temperature is preferably maintained between about 1850° F. and 2050° F. for between 3 and 4 hours. To prevent surface contamination from occurring during the heat treatment process, the filter assemblage is preferably heat treated in a hydrogen atmosphere at atmospheric pressure. Alternatively, heat treatment may be performed in a vacuum furnace.

As the filter assemblage is heated, the binder is first driven and/or burned off. Then, the low temperature component of the particulate material melts and flows into the interstices between the particles of the high temperature component. The molten low temperature component also flows into the openings such as the pores in the filter pack and along the end cap. While the invention is not limited by theory, it is believed that the molten low temperature component is somewhat restrained within the interstices of the particles of the high temperature component, significantly impeding any wicking of the molten low temperature component along the filter pack away from the end cap. In any event, the molten low temperature component does not significantly wick up into the filter pack and little or none of the filter pack is blinded by the molten low temperature component. Rather, the molten low temperature component remains concentrated in the end cap and near the end of the filter pack to form a solid braze bond when it solidifies.

As the filter assemblage cools, the molten low temperature component solidifies, forming a strong bond between the particles of the high temperature component, the end cap, and the filter pack. This braze bond is further augmented by the presence of the high temperature component. Consequently, a filter assembly according to the present invention is highly effective because little or none of the filter pack is blinded by the low temperature component, extremely reliable because there are no leakage paths around the filter pack, and ruggedly durable because the bond between the end caps and the filter pack is exceptionally strong.

The method of making a filter assembly according to this invention encompasses several variations of the method previously described. For example, the filter pack may be seated in the end caps and the low and high temperature components of the particulate material, the binder, and the carrier liquid may be added in any suitable order. For example, instead of seating the filter pack in the end cap and then adding the mixture, the mixture may be added to the end cap before the filter pack is seated. Or, the particulate material may be added to the end cap before the filter pack 20 is seated. The carrier liquid and the binder may then be subsequently added to the end cap either before or after the filter pack 20 is seated. Or, the carrier liquid and the binder may be added to the end cap before the filter pack is seated. The particulate material may then be subsequently added to the end cap either before or after the filter pack is seated.

EXAMPLE

An end cap was bonded to a filter pack to form a filter assembly by the method set forth below. This example is presented by way of illustration and not by way of limitation.

A particulate material was formed by mixing 45 $\mu$m particles of Nicrobraz ® nickel brazing alloy powder with 30 μm particles of 304L water atomized stainless steel in a ratio of about 1:1 by weight. A binder mixture was formed by mixing Carbopol 934 with water in a ratio of about 1:70 by weight. A binder/particulate mixture was formed by mixing the particulate material with the binder mixture in a ratio of about 1:1 by volume.

The trough of a stainless steel end cap was filled with the binder/particulate mixture, and bubbles were removed from the binder/particulate mixture by vacuum degassing.

The larger end of a pleated, truncated conical filter pack was then placed in the trough of the end cap. The filter pack included a filter medium comprising a 325×325 wire mesh of 0.0014 inch diameter 304L stainless steel wire and a support layer of 42×42 wire mesh of 0.006 inch and 0.0045 inch 304L stainless steel wires, respectively. The support layer was corrugated with the filter medium on the downstream side of the filter medium, the intended flow being inside-out through the filter pack. The end of the filter pack was gently worked into the binder/particulate mixture in the trough of the end cap until the end of the filter pack was seated in the end cap.

The filter assemblage including the filter pack, the end cap, and the binder/particulate mixture was placed in a jig. The jig was placed on a vibrating table and vibrated for about 1 minute to work the binder/particulate mixture between the pleats of the filter pack and to promote insinuation of the binder/particulate mixture into the filter pack. The water was then removed from the binder/particulate mixture by drying the filter assemblage for about 1.5 hours at 180° F.

The filter assemblage was then removed from the jig and the trough of a second end cap was filled with the binder/particulate mixture and the smaller end of the filter pack was placed in the trough of a second end cap. The previously discussed steps of degassing the binder/particulate mixture, placing the filter assemblage in a jig, and drying the filter assemblage were then repeated. However, the filter assemblage was dried the second time for about 3 hours at 180° F. to remove residual liquid which remained from the initial drying process.

The filter assemblage was then heat treated at about 2000° F. for about 3.5 hours in a hydrogen atmosphere.

Thus, while several embodiments of the invention have been described in some detail, it should be understood that the invention encompasses various modifications and alternative forms of those embodiments. It should also be understood that the specific embodiments are not intended to limit the invention, but are intended to cover all modifications, equivalents and alternatives falling within the spirit and scope of the claims.

What is claimed is:

1. A method of making a filter assembly comprising the steps of:
   seating a filter pack in an end cap;
   contacting the filter pack and the end cap with a mixture including a binder and a particulate material, the particulate having a low temperature component and a high temperature component; and
   heat treating the particulate material at a temperature sufficient to melt the low temperature component without melting the high temperature component to bond the end cap to the filter pack.

2. A method of making a filter assembly as claimed in claim 1 further comprising drying the mixture prior to heat treating.

3. A method of making a filter assembly as claimed in claim 1 wherein said contacting step includes agitating the filter pack and the end cap.

4. A method of making a filter assembly as claimed in claim 1 wherein the low temperature component of the particulate material comprises a nickel based alloy.

5. A method of making a filter assembly as claimed in claim 1 wherein the high temperature component of the particulate material comprises a metal particulate.

6. A method of making a filter assembly as claimed in claim 1 wherein the high temperature component of the particulate material comprises a ceramic material.

7. A method of making a filter assembly as claimed in claim 1 comprising contacting the end cap with the mixture including a binder and a particulate material before seating the filter pack in the end cap.

8. A method of making a filter assembly as claimed in claim 1 comprising contacting the filter pack and the end cap with the mixture including a binder and a particulate material after seating the filter pack in the end cap.

9. A method of making a filter assembly as claimed in claim 1 further comprising removing bubbles from the mixture prior to heat treating.

* * * * *